United States Patent Office 3,350,349
Patented Oct. 31, 1967

3,350,349
ROOM TEMPERATURE CURING ORGANOPOLY-
SILOXANE RESINS
James Franklin Hyde, Midland, Mich., assignor to Dow
Corning Corporation, Midland, Mich., a corporation of
Michigan
No Drawing. Filed Mar. 13, 1961, Ser. No. 95,026
9 Claims. (Cl. 260—46.5)

This invention relates to a room temperature curing organopolysiloxane resin system wherein a silicon-bonded hydroxyl group and a silicon-bonded oxyorganic group react in the presence of an amine at room temperature. This application is a continuation-in-part of my copending application Ser. No. 755,438, filed Aug. 18, 1958, and now abandoned.

There has long been a search for an organopolysiloxane resin system which cured at room temperature. The inability to find such a system has necessitated the numerous combinations of silicone resins with organic resins which are now well known in the art. However, the inclusion of any organic resin with a silicone resin must of necessity be detrimental to the final physical properties of the resin mixture due to the fact that organic resins have poorer aging characteristics than silicone resins. Organopolysiloxanes have been cured with heating employing amine catalysts. However, nowhere in the past has an organopolysiloxane resin system been found which would cure at room temperature with an amine catalyst.

It has been found that the method of this invention not only produces a new curing system for organopolysiloxane resins, but that with this system a room temperature cure is obtainable. This makes the application of pure silicone resins to wood feasible thereby opening the way for a silicone resin wood finish.

This invention relates to a method comprising contacting an organosilicon composition having an average of from 0.9 to 1.9 R radicals per silicon atom attached to the silicon atom through a carbon-silicon linkage and containing as functional groups both silicon-bonded hydroxyl radicals and R′ radicals attached to silicon atoms through silicon-oxygen-carbon linkages with an amino compound having a basic dissociation constant in dilute solution in water ranging from $10^{-7}$ to $10^{-1}$ at 25° C.

The organosilicon composition employed in this invention must contain an average of from 0.9 to 1.9 R radicals per silicon atom attached to the silicon atom through a carbon-silicon linkage. These R radicals can be any monovalent hydrocarbon radical or monovalent hydrocarbon ether radical which can contain groups which will not interfere with the reaction of this invention either by entering into the polymeric structure or reacting with the amine catalyst. Groups which are known not to interfere and which therefore can be present in the R radicals include the hydroxyl group, any halogen atoms attached to an aromatic group and the fluorine atom in any radical.

More specifically, each R can be any monovalent hydrocarbon radical, for example, an alkyl radical such as methyl, ethyl, isopropyl, t-butyl, 2-ethylhexyl, or octadecyl; an alkenyl radical such as vinyl, allyl, decenyl or butadienyl; a cycloalkyl radical such as cyclohexyl or cyclopentyl; a cycloalkenyl radical such as cyclopentyl or cyclo-2,4-hexadienyl; an aryl radical such as phenyl, xenyl or naphthyl; an alkaryl radical such as tolyl or xylyl; or an aralkyl radical such as benzyl. These monovalent hydrocarbon radicals can also contain aromatic halogens to form, for example, such radicals as 2,4,6-trichlorobenzyl, perchlorophenyl, 2-bromonaphthyl, p-iodophenylethyl and the like. R can be any fluorinated monovalent hydrocarbon radical such as, for example, 3,3,3-trifluoropropyl, α,α,α-trifluorotolyl, 5,5,5-trifluoro-2-trifluoromethylamyl, and p-fluorophenyl radicals, or any hydroxylated monovalent hydrocarbon radical such as, for example, the 4-ethyl-4-hydroxyhexyl, 3-hydroxyallyl, cresyl, p-hydroxyphenyl and

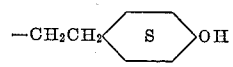

radicals.

As stated above each R can be any of various monovalent hydrocarbon ether radicals such as the

—CH$_2$CH$_2$OCH$_2$CH$_3$

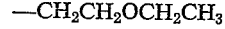

—CH$_2$(OCH$_2$CH$_2$)$_2$OCH$_3$
—CH$_2$OCH$_2$CH=CH$_2$
—CH$_2$CH$_2$CH$_2$CH$_2$CHOHCH$_2$OCH$_3$

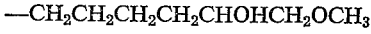

—CH$_2$CH$_2$OCH$_2$CHOHCH$_2$OCH$_2$CHOHCH$_3$ and furyl radicals and their fluorinated or halogenoaromatic counterparts, e.g.

—CF$_2$CF$_2$OCF$_2$CF$_3$

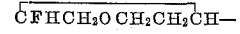
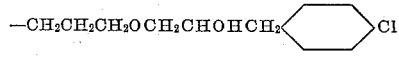

etc.

The organosilicon composition employed in this invention must contain both silicon-bonded hydroxyl radicals and R′ radicals attached to silicon through silicon-oxygen-carbon linkages. The R′ radicals can be any of the radicals set forth above for R above with the exception that in any R′ radical the total number of carbon atoms and ethereal oxygen atoms, if any, cannot exceed ten. When the R′ radicals are larger than this, the rate of curing of the resin at room temperature is not practical.

The method of this invention is believed to involve the reaction of silicon-bonded hydroxyl groups and SiOR′ groups in the presence of amine to give an alcohol R′OH and SiOSi linkages. It is established, however, that organosilicon compounds containing these groups will cure at room temperature in the presence of an amine or ammonia. The silicon-bonded hydroxyl groups and SiOR′ groups can be present in the same molecule or different molecules, but both types of groups must be present. Thus, the organosilicon composition can be a single component such as an essentially homopolymeric organopolysiloxane, a copolymeric organopolysiloxane, a silanol, a silane of the formula R$_n$SiOR′$_{4-n}$ where $n$ is 1 or 2, or a mixture of two or more of any of these with each other or a mixture of one or more of the aforesaid organosilicon compositions with an orthosilicate or polysilicate or mixtures thereof. In order to achieve a satisfactory resin it is necessary that at least one molecular species of the organosilicon composition be at least trifunctional, i.e., that it contain per molecule at least three SiOH and/or SiOR′ groups. There can be some molecular species present which are monofunctional, but most of any other molecular species present should be at least difunctional. The only maximum limit on functionality is the change in physical properties of the ultimate product as the R to Si ratio is reduced. As a practical matter, resins having an R to Si ratio below 0.9 are so brittle as to be of dubious value commercially, especially for coating, a use in which the method of this invention is especially valuable.

More specifically, the organosilicon composition can contain, for example, any of the following molecular species:

R₃Si(OR'), R₂Si(OR')₂, RSi(OR')₃,
Si(OR')₄, R₃Si(OH), R₂Si(OH)₂
R₂Si(OH)(OR'), RSi(OR')₂(OH)
Si(OR')₃(OH), (R'O)₃SiOSi(OR')₃

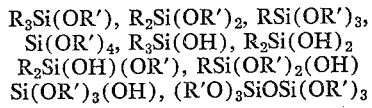

R₃SiO[Si(OR')₂O]ₓSiR₂(OH)

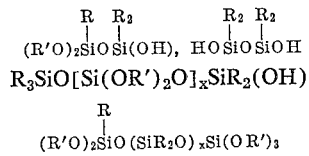

and

R₃SiO(SiR₂O)ₐ[Si(OR')RO]ᵦ[Si(OH)RO]ᵧ
[Si(OR')₂O]_d[Si(OR')(OH)O]ₑ[Si(OR')
O_{1.5}]_f[Si(OH)O_{1.5}]_g(SiRO_{1.5})_hSi(OR')₃ where the subscript letters can have any non-negative value.

These species are illustrative but cannot include all the possible variations. However, this representative list is sufficient to show the scope of the materials which can be a part of the organosilicon composition.

One preferred embodiment of this invention is the method employing as the organosilicon composition a mixture of two components, one of which comprises organopolysiloxanes having at least two functional groups per molecule and the other of which comprises polyfunctional silicate compounds having at least three and preferably more functional groups per molecule. The organopolysiloxane component is preferably a resin having an R/Si ratio of from 1 to 1.9 and at least two silicon-bonded hydroxyl groups per molecule amounting to at least about 0.1 percent by weight silicon-bonded hydroxyl groups. The R groups are preferably methyl and phenyl radicals such that the phenyl to silicon ratio for the organopolysiloxane component ranges from 0.25:1 to 1.0:1. Such resins inherently have good coating properties. While there can be some SiOR' groups present, it is preferable that they be at a minimum in order to better control the ultimate resin structure.

The polyfunctional silicate compounds can be composed entirely of molecules made up of units of the formula R(R'O)₃Si and partial hydrolyzates thereof such as R(R'O)₂SiO[SiR(OR')O]ₓSiR(OR')₂ and

R(R'O)₂SiOSiR[OSiR(OR')₂]₂

However, it is preferable that the silicate component be composed of molecules consisting essentially of units of the formula (R'O)_mSiO_{4-m/2} in which R' is as above defined and each m can be 1, 2, 3 or 4. This formula represents both orthosilicates and polysilicates. In this specification, the term "orthosilicate" represents a composition of the formula (R'O)₄Si. The term "polysilicate" represents compositions having such configurations as, for example, (R'O)₃SiOSi(OR')₃, [Si(OR')₂O]_y where y is at least 3,

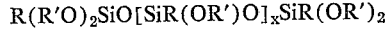

and (R'O)₃SiO[Si(OR')₂O]ₓSi(OR')₃ where x is at least 1. The polysilicates operative in this invention are solvent-soluble partial hydrolyzates of the orthosilicates.

Mixtures of the orthosilicates, trifunctional silanes and their partial hydrolyzates are operative as well as co- hydrolyzates of these materials. Examples of such cohydrolyzates include (R'O)₂RSiOSi(OR')₃

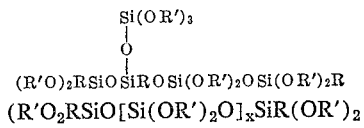

(R'O₂RSiO[Si(OR')₂O]ₓSiR(OR')₂ and (R'O)₂RSiO[Si(OR')₂O]ₓSi(OR')₃ where x is at least 1.

The amino component in the method of this invention can be any amino compound having a basic dissociation constant as defined above. Thus, the amino compound can be ammonia, a primary amine, a secondary amine, a tertiary amine or any combination of these. These are not rearrangement catalysts as are the quaternary ammonium and alkali metal compounds which are excluded by the $10^{-1}$ maximum limitation on the dissociation constant. However, to be operative in the instant method, the amines must have a basic dissociation constant above $10^{-7}$ at 25° C. Examples of operative amines include the following: brucine, sec-butylamine, cocaine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, ethanolamine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, morphine, nicotine, novocain base, epsilon-phenylamylamine, delta-phenylbutylamine, β-phenylethylamine, β-phenylethylmethylamine, gamma-phenylpropylamine, N,N - isopropylbenzylamine, physostigmine, piperazine, quinidine, solamine, sparteine, thebaine, t-butyl-2,4-dinitrophenylamine, t-butyl-2-hydroxy-5-nitrobenzylamine, t - butyl - 4 - isonitrosoamylamine, t-octylamylamine, t-octyl - 2 - (β - butoxyethoxy)ethylamine, 2,4,6-tris(di-methylamino)-phenol, and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine.

Ammonia can be used as a catalyst either by exposure of the organosilicon composition to a stream of ammonia in a closed system or by generating the ammonia in situ as by the decomposition of a compound such as ammonium carbonate in contact with the organosilicon composition.

Furthermore, the type of silanes disclosed in U.S. Patent 2,971,864, issued Feb. 14, 1961, to John L. Speier and partial hydrolyzates of such silanes are operative. The silanes have the general unit formula (R''O)₃SiR'''Zₙ in which each R'' is an alkyl radical of less than four carbon atoms, each R''' is an aliphatic hydrocarbon radical containing one or more than two carbon atoms, preferably from three to five carbon atoms, and having a valence of n+1 where n is at least 1 and preferably no more than about 3 and each Z is a monovalent radical attached to R''' by a carbon-nitrogen bond and composed of hydrogen atoms, carbon atoms and nitrogen atoms. Each Z radical contains at least two amine groups and preferably no more than eight carbon atoms, and the ratio of carbon atoms to nitrogen atoms in the silicon substituent —R'''Z$_n$ is less than 6:1. They are prepared by reacting a polyamine with a halogenohydrocarbonyltrialkoxysilane where the halogen is not on a carbon atom beta to silicon. The halogenohydrocarbonyltrialkoxysilanes are produced by halogenating an alkylhalogenosilane with subsequent alcoholysis of the silicon-bonded halogens or by the method discussed in French Patent 961,878. The partial hydrolyzates of these silanes are formed by the hydrolysis of some (R''O) groups with the subsequent condensation of the silanols to form SiOSi linkages. Examples of such materials are (CH$_3$O)$_3$Si(CH$_2$)$_3$NHCH$_2$CH$_2$NH$_2$ and (CH$_3$O)[Si(OCH$_3$)(CH$_2$CH$_2$CH$_2$NHCH$_2$CH$_2$NH$_2$)O]$_2$Si(OCH$_3$)$_2$(CH$_2$CH$_2$CH$_2$NHCH$_2$CH$_2$NH$_2$)

Also operative as catalysts are such materials as the disiloxanes of the formula O[Si(CH$_3$)$_2$(CH$_2$)$_n$NH$_2$]$_2$ disclosed in U.S. Patent 2,557,803, silanes of the formula [PhMe$_2$Si(CH$_2$)$_n$]$_2$CHNH$_2$ and [Me$_3$Si(CH$_2$)$_n$]$_2$CHNH$_2$ disclosed in U.S. Patent 2,662,909, the aminomethylsiloxanes disclosed in U.S. Patent 2,738,357 and the aminomethylsilanes and silcarbazanes disclosed in U.S. Patent 2,715,133. Now well known in the art are compositions such as (C$_2$H$_5$O)$_3$SiCH$_2$CH$_2$CH$_2$NH$_2$ disclosed in U.S. Patent 2,832,754 which is also operative.

The amine can also be present in a composition such as (CH$_3$)$_3$SiOCH$_2$CH$_2$CH$_2$NH$_2$ or (C$_2$H$_5$O)$_3$SiOCH$_2$CH$_2$CH$_2$NHCH$_2$CH$_2$NH$_2$ prepared by reaction of an alkanol amine with a halogenosilane and subsequent alcoholysis where necessary. These amino compounds can be used to supply both the amine component and the silicate component to the system employed in this invention if desired. In other words a composition such as [NH$_2$CH$_2$CH$_2$O]$_4$Si would supply a tetrafunctional silicon atom as well as ethanol amine to the system. Such special systems are within the scope of the claims of this invention.

A preferred embodiment of the method of this invention employing combination compounds incorporating a polyfunctional silicate and an amine is the method comprising mixing together (1) an organopolysiloxane having an average of at least two silicon-bonded hydroxyl groups per molecule, i.e., at least about 0.1 percent by weight silicon-bonded hydroxyl groups, and from 1.0 to 1.9 silicon-bonded monovalent hydrocarbon radicals per silicon atom, and (2) at least 0.01 part by weight per 100 parts of (1) of a silane of the formula (R''O)$_3$SiR'''Y$_n$ in which each R'' is an alkyl radical of less than four carbon atoms, each R''' is an aliphatic hydrocarbon radical containing from three to five carbon atoms and having a valence of $n+1$ where $n$ is an integer from 1 to 3 and Y is a monovalent radical attached to R''' by a carbon-nitrogen bond and composed of hydrogen atoms, nitrogen atoms and up to eight carbon atoms and containing at least one amine group, the ratio of carbon atoms to nitrogen atoms in Y being less than about 6:1 and thereafter allowing the mixture to cure. Component (2) herein includes the materials disclosed in both U.S. Patents 2,971,864 and 2,832,754 referred to above.

The materials employed in this invention are either well known in the art or are easily producible by means disclosed by reference or already well known in the art. While the actual proportions of ingredients are not considered critical, it is necessary that both the organosilicon composition and the amino compound be present together to produce a curing system. Where the three component system, i.e. organopolysiloxane, silicate and amine, is employed, any two of the three components can be stored without appreciable change. It is only when all three components are mixed together that curing starts to take place spontaneously at room temperature. This mixture can be in solvent solution.

The rate of cure accomplished by this invention depends on the concentration of SiOR' groups and SiOH groups in the system and on the basicity of the system. In other words, the number of functional groups per molecule, the number of molecules of the organosilicon composition present in the system and the amount of the amino compound in the system all affect the rate of cure of the resin. In order to reduce the number of variables in a given system it is preferable as stated above to employ a two-component organosilicon composition in which the organopolysiloxane component (1) has essentially only SiOH groups and the other component (2) has essentially only SiOR' groups. This arrangement produces a more orderly system and makes possible much better ultimate organosilicon coating resins than were previously possible. It is preferable that there be one molecule of component (2) per silicon-bonded hydroxyl group in component (1) and that there be a sufficient amount of amine or ammonia to make the system definitely basic, i.e. pH above 7. It is preferable, also, that no more than 10 parts of component (2) or 10 parts of amine per 100 parts of component (1) be present in the system in order to better control the rate of cure and the ultimate product.

Additives common to other silicon resin systems can also be included in the mixture employed in this invention. Generally, such additives as pigments and sunscreening agents are incorporated into the resin organosilicon composition but they can also be added separately or with the amine.

This invention produces compositions which when employed as a paint or varnish can cure to a hard dry film on wooden, metal, glass, ceramic, and the like, surfaces within 24 hours at room temperature in air. Application can be by brushing, spraying or dipping. The first manifestation is surface gelation followed by a hardening within the film. It is to be understood that a base member can be coated with the complete mixture or with some of the mixture components which are subsequently activated by introduction of the third component as by spraying a silicate, amine or resin solution on a pretreated base member or exposure to vapors such as ammonia or a volatile amine.

The following examples are merely illustrative and are not intended to limit this invention which is properly delineated in the claims. In these examples except where otherwise noted the term "EPS" designates an ethylpolysilicate having a viscosity of 12.2 cs. at 25° C. and containing 21.6 percent by weight silicon and 64.8 percent by weight ethoxy radicals.

*Example 1*

Ten grams of a 60 percent by weight solution in toluene of a copolymer of 68 mol percent monomethylsiloxane units and 32 mol percent monophenylsiloxane units and containing approximately 0.55 percent by weight silicon-bonded hydroxyl groups were mixed with 0.1 gram of a mixture of 2 parts by weight EPS and 1 part by weight di-n-amylamine.

This composition was brushed on a cedar panel. The resulting coating gelled to a tack-free state in 30 minutes in air at room temperature and was cured within 24 hours under the same conditions.

*Example 2*

Ten grams of a 50 percent by weight solution in xylene of a copolymer of 35 mol percent phenylmethylsiloxane units, 10 mol percent dimethylsiloxane units, 25 mol percent monomethylsiloxane units and 30 mol percent monophenylsiloxane units and containing approximately 0.65 percent by weight silicon-bonded hydroxyl groups were mixed with 0.17 gram of the EPS-di-n-amylamine mixture of Example 1.

A coating of this composition on a cedar panel gelled in 15 minutes in air at room temperature and cured within 16 hours under the same conditions.

Example 3

Ten grams of a 60 percent by weight solution in toluene of a copolymer of 29.3 mol percent dimethylsiloxane units, 32.0 monomethylsiloxane units and 38.7 mol percent monophenylsiloxane units and containing approximately 2.75 percent by weight silicon-bonded hydroxyl groups were mixed with 0.17 gram of the EPS-di-n-amylamine mixture of Example 1.

A coating on a cedar panel of this composition cured in 4 to 5 hours.

Example 4

Ten grams of the resin solution of Example 2 were mixed with 0.11 gram of EPS and 0.11 gram of di-n-amylamine. This composition cured as a coating on a cedar panel within 24 hours in air at room temperature.

Example 5

28.9 grams of the resin solution of Example 2 were mixed with 0.75 gram of EPS and 0.4 gram of di-n-amylamine. This composition cured as a coating on a cedar panel within 24 hours in air at room temperature.

Example 6

Two grams of a 50 percent by weight solution in xylene of a copolymer of 35 mol percent phenylmethylsiloxane units, 10 mol percent dimethylsiloxane units, 25 mol percent monomethylsiloxane units and 30 mol percent monophenylsiloxane units and containing approximately 8 percent by weight silicon-bonded hydroxyl groups were mixed with 0.15 gram of the EPS-di-n-amylamine mixture employed in Example 1. A coating of this composition on a cedar panel was partially cured in 5 hours in air at room temperature.

This experiment was repeated using 0.30 gram of the EPS-di-n-amylamine mix. The rate of cure of a coating on wood was approximately twice that of the above system.

Example 7

42.5 grams of the resin solution of Example 2 were diluted with 20 grams of toluene and mixed with 0.75 gram of EPS and 0.4 gram of diamylamine. A cedar panel was coated with this composition. After 1½ hours of air-drying at room temperature a second coat was added which gelled to a tack-free state in 2 hours and cured within 16 hours.

Example 8

59.1 grams of a 57 percent by weight solution in toluene of the resin of Example 6 were mixed with 1.19 grams of EPS and 0.65 gram of di-n-amylamine. This composition air-dried rapidly when used as a coating on a cedar panel. A second coat gelled to a tack-free state in air at room temperature in two hours.

Example 9

46.25 grams of the resin solution of Example 2 were mixed with 0.7 gram of EPS and 0.4 gram of dodecyldimethylamine. This composition as a coating on a cedar panel gelled to an almost tack-free state in 30 minutes in air at room temperature.

Example 10

55 grams of a 60 percent by weight solution in xylene of a copolymer of 35 mol percent phenylmethylsiloxane units, 10 mol percent dimethylsiloxane units, 25 mol percent monomethylsiloxane units and 30 mol percent monophenylsiloxane units and containing 3 to 4 percent by weight silicon-bonded hydroxyl groups were mixed with one gram of EPS and 0.5 gram of dodecyldimethylamine. This composition was applied as a coating to a cedar panel. This coating was only slightly tacky after only one hour in air at room temperature.

Example 11

28 grams of the resin solution of Example 10 were mixed with 0.08 gram of ethylorthosilicate and 0.04 to 0.05 gram of di-n-amylamine. This composition was applied to a cedar panel. After 16 hours of air drying at room temperature the coating was sufficiently cured that a second coat did not dissolve the first coat.

Example 12

28.08 grams of the resin solution of Example 10 were mixed with 8.25 grams of ethylorthosilicate and 0.05 gram of di-n-amylamine. This composition cured within 16 hours in air at room temperature as a coating on a cedar panel.

The above composition was prepared adding in addition 0.08 gram of tri-n-amylamine. When this composition was used for coating a cedar panel, the coating cured in less than six hours in air at room temperature.

Example 13

20.29 grams of a 30 percent by weight solution in xylene of a copolymer of 55 mol percent phenylmethylsiloxane units, 30 mol percent monomethylsiloxane units and 15 mol percent monophenylsiloxane units and containing at least 1.0 percent by weight silicon-bonded hydroxyl groups were mixed with 1.0 gram of methyl cellosolve orthosilicate and 0.5 gram of di-n-amylamine. This mixture gelled in 2 minutes.

Example 14

When one gram of each of the following amines is mixed with 40 grams of the resin solution of Example 10 and 2 grams of EPS, the resulting compositions air-cure to a tack-free gel as coatings on wood at room temperature within 16 hours: sec-butylamine, ethylenediamine, piperidine, conine, ethanolamine, o-methoxybenzylamine, piperazine, N,N-isopropylbenzylamine and sparteine.

Example 15

When 2 grams of each of the following materials is mixed with 40 grams of the resin solution of Example 10 and 2 grams of EPS, the resulting compositions make excellent wood coatings which air-dry tack-free at room temperature within 24 hours:

the condensation product of ethylamine and formaldehyde
$(CH_3)_3SiOCH_2CH_2CH_2NH_2$
$(CH_3)_3SiCH_2NHC_3H_7$
$[(CH_3)_3SiCH_2]_2NH$
$(CH_3)_3SiCH_2NHC_6H_5$
$(CH_3)_2(C_6H_5)SiCH_2NH_2$
$(CH_3)_3SiCH_2N(CH_3)_2$
$(CH)_3SiCH_2NHCH_2CH_2OH$
$(CH_3)_2(C_2H_5O)SiCH_2NHC_6H_{11}$
$C_3H_7NHCH_2Si(CH_3)_2OSi(CH_3)_2CH_2NHC_3H_7$
$[(CH_3)_3SiCH_2CH_2]_2CHNH_2$
$[NH_2CH_2CH_2Si(CH_3)_2]_2O$
$(C_2H_5O)_3SiCH_2CH_2CH_2NH_2$
$(CH_3O)_3Si(CH_2)_3NHCH_2CH_2NH_2$

Example 16

When a wooden panel is coated with a mixture of 40 parts by weight of the resin solution of Example 10 and 2 parts of EPS and the coated panel is subsequently exposed to a stream of ammonia gas at room temperature for four hours, the coating is cured to a tack-free gel.

Example 17

When each of the following organosilicon compositions in the amounts shown is mixed with 167 grams of the resin solution of Example 10 and 2 grams of n-hexylamine, the resulting compositions will air-dry to a tack-free gel in less than 24 hours at room temperature when applied as coatings to wooden panels.

0.5 gram Si[O(CH$_2$CH$_2$O)$_2$C$_2$H$_5$]$_4$
2 grams Si(OC$_5$H$_{11}$)$_4$
1.5 grams Si(OCH$_2$—CH=CH$_2$)$_4$
3 grams Si(OCH$_2$CH$_2$OCH=CH$_2$)$_4$
3 grams Si(OC$_6$H$_{11}$)$_4$
2 grams Si(OCH$_3$)$_3$(OC$_6$H$_4$Cl)
6 grams Si[OC$_6$H$_3$(CH$_3$)OH]$_4$
8 grams Si(OCH$_2$C$_2$F$_5$)$_4$
5 grams (CF$_3$CH$_2$O)$_3$SiOSi(OCH$_2$CF$_3$)$_3$
4 grams (C$_3$H$_7$O)$_3$SiO[Si(OC$_3$H$_7$)$_2$O]$_3$OSi(OC$_3$H$_7$)$_3$
0.2 gram [(CH$_3$OCH$_2$CH$_2$O)$_3$Si]$_2$O
4 grams PhSi(OCH$_2$CH$_2$OCH$_3$)$_3$ 4 grams CH$_2$=C(CH$_3$)—CH$_2$Si(OCH$_2$CH$_2$OCH$_3$)$_3$ 6 grams C$_5$H$_9$Si(OCH$_3$)$_3$
4 grams CF$_3$CH$_2$CH$_2$Si(OCH$_2$CH$_2$OCH=CH$_2$)$_3$
4 grams Cl—C$_6$H$_4$—Si(OCH$_2$CH=CH$_2$)$_3$ 4 grams CH$_2$CH$_2$OCH$_2$CHSi(OCH$_2$CH$_2$OC$_2$H$_5$)$_3$ 4 grams CH$_3$CHOHCH$_2$OCH$_2$CHOHCH$_2$OCH$_2$CH$_2$Si(OCH$_2$CH$_2$OCH$_3$)$_3$
4 grams CH$_3$Si(OC$_2$H$_5$)$_2$O[Si(OC$_4$H$_9$)$_2$O]$_3$[Si(C$_6$H$_5$)(OC$_2$H$_5$)O]$_2$Si(OC$_3$H$_7$)$_3$
4 grams [Si(OC$_2$H$_5$)$_2$O]$_4$

Example 18

When 20 grams of

HOSi(C$_6$H$_5$)(CH$_3$)OSi(CH$_3$)$_2$OSi(C$_6$H$_5$)(OH)OSi(CH$_3$)$_2$OSi(C$_6$H$_5$)(CH$_3$)OH are mixed with 1 gram of EPS and 1 gram of piperidine, the resulting composition when employed as a wood coating air-dries to a tack-free gel at room temperature within 24 hours.

Example 19

When 20 grams of each of the following organopolysiloxanes are mixed with 1 gram of EPS and 1 gram of n-hexylamine, the resulting compositions are excellent for coating wood. Such coatings air-dry at room temperature within 24 hours.

As a 50 percent by weight solution in xylene a copolymer of 31.4 mol percent phenylmethylsiloxane units, 34.0 mol percent monomethylsiloxane units and 34.6 mol percent monophenylsiloxane units and containing 0.75 percent by weight silicon-bonded hydroxyl groups.

As a 75 percent by weight solution in toluene a mixture of (1) 50 percent by weight of a copolymer of 75 mol percent monomethylsiloxane units, 24 mol percent dimethylsiloxane units and 1 mol percent trimethylsiloxane units and containing 0.4 percent by weight silicon-bonded hydroxyl groups and (2) 50 percent by weight of a copolymer of 25 mol percent monomethylsiloxane units, 35 mol percent monophenylsiloxane units, 20 mol percent dimethylsiloxane units and 20 mol percent diphenylsiloxane units and containing 4.8 percent by weight silicon-bonded hydroxyl groups.

As a 60 percent by weight solution in xylene a copolymer of 22 mol percent isopropylvinylsiloxane units, 30 mol percent monophenylsiloxane units, 5 mol percent monohexylsiloxane units, 1 mol percent monooctadecylsiloxane units, 1 mol percent monocyclopentylsiloxane units, 1 mol percent monobenzylsiloxane units and 40 mol percent diethylsiloxane units and containing 2.0 percent by weight silicon-bonded hydroxyl groups.

As a 50 percent by weight solution in xylene a copolymer of 85 mol percent monophenylsiloxane units, 10 mol percent dimethylsiloxane units and 5 mol percent diphenylsiloxane units and containing 3.5 percent by weight silicon-bonded hydroxyl groups.

Example 20

When 1 gram of n-hexylamine is mixed with 40 grams of a 50 percent by weight solution in xylene of an organopolysiloxane copolymer of 35 mol percent phenylmethylsiloxane units, 10 mol percent dimethylsiloxane units, 25 mol percent monomethylsiloxane units and 30 mol percent monophenylsiloxane units and containing 3 percent by weight silicon-bonded hydroxyl groups and 4 percent by weight silicon-bonded ethoxyl groups, the resulting composition will air-dry at room temperature to a tack-free gel within 24 hours when applied as a coating to a cedar panel.

Example 21

20 grams of a 50 percent by weight solution in xylene of a copolymer of 55 mol percent phenylmethylsiloxane units, 30 mol percent monomethylsiloxane units and 15 mol percent monophenylsiloxane units and containing approximately 1 percent by weight silicon-bonded hydroxyl groups were mixed with 10 grams of a TiO$_2$ pigment and 1 gram of (CH$_3$O)$_3$SiCH$_2$CH$_2$CH$_2$NHCH$_2$CH$_2$NH$_2$.

A coating of this composition on aluminum panels cured to hard tack-free state in air at room temperature in less than 24 hours.

Example 22

When 0.2 gram and 0.3 gram of (CH$_3$O)$_3$SiCH$_2$CH$_2$CH$_2$NHCH$_2$CH$_2$NH$_2$ are each substituted for the 1 gram of the same ingredient in Example 21, similar hard tack-free coatings on aluminum panels are obtained in air at room temperature in less than 24 hours.

Example 23

When the following compounds are substituted mol per mol for the (CH$_3$O)$_3$SiCH$_2$CH$_2$CH$_2$NHCH$_2$CH$_2$NH$_2$ in Example 22, similar results are obtained:

(C$_2$H$_5$O)$_3$SiCH$_2$CH$_2$CH$_2$NH$_2$ (C$_2$H$_5$O)$_3$SiCH$_2$CH$_2$CH$_2$NHCH$_2$CH$_2$NH$_2$ (CH$_3$O)$_3$SiCH$_2$CH$_2$CH$_2$N(CH$_3$)$_2$ and (CH$_3$O)$_3$SiCH$_2$CH$_2$CH$_2$CH$_2$NH$_2$ That which is claimed is:

1. A method comprising mixing together (1) an organosilicon composition having an average of at least two silicon-bonded hydroxyl groups per molecule and from 1.0 to 1.9 silicon-bonded monovalent hydrocarbon radicals per silicon atom and (2) at least 0.01 part by weight per 100 parts of (1) of a silane of the formula (R″O)$_3$SiR‴Y$_n$ in which each R″ is an alkyl radical of less than four carbon atoms, each R‴ is an aliphatic hydrocarbon radical containing from three to five carbon atoms and having a valence of $n+1$ where $n$ is an integer from 1 to 3 and Y is a monovalent radical attached to R‴ by a carbon-nitrogen bond and composed of hydrogen atoms, nitrogen atoms and up to eight carbon atoms and containing at least one amine group, the ratio of carbon atoms to nitrogen atoms in Y being less than about 6:1 and thereafter allowing the mixture to cure.

2. The method of claim 2 wherein Component 2 is (C$_2$H$_5$O)$_3$SiCH$_2$CH$_2$CH$_2$NH$_2$.

3. A resinous composition consisting essentially of the reaction product of claim 1.

4. A method comprising mixing together (1) an organosilicon composition having an average of at least two silicon-bonded hydroxyl groups per molecule and from 1.0 to 1.9 silicon-bonded monovalent hydrocarbon radicals per silicon atom and (2) at least 0.01 part by weight per 100 parts of (1) of a silane of the formula (R″O)$_3$SiR‴Z$_n$ in which each R″ is an alkyl radical of less than four carbon atoms, each R‴ is an aliphatic hydrocarbon radical containing from three to five carbon atoms and having a valence of $n+1$ where $n$ is an integer of from 1 to 3 and each Z is a monovalent radical attached to R‴ by a carbon-nitrogen bond and composed of hydrogen atoms, nitrogen atoms and from one to eight carbon atoms and containing at least two amine groups, the ratio of carbon atoms to nitrogen atoms in the silicon substituent —R'''$Z_n$ being less than 6:1 and thereafter allowing the mixture to cure.

5. The method of claim 4 wherein Component 2 is $(CH_3O)_3SiCH_2CH_2CH_2NHCH_2CH_2NH_2$.

6. The method of claim 4 wherein Component 2 is $(C_2H_5O)_3SiCH_2CH_2CH_2NHCH_2CH_2NH_2$.

7. A resinous composition consisting essentially of the reaction product of claim 4.

8. A method comprising mixing together (1) an organosilicon composition containing an average of at least two silicon-bonded hydroxyl groups per molecule and from 1.0 to 1.9 silicon-bonded methyl and phenyl radicals per silicon atom of which from 0.25 to 1.0 radical is the phenyl radical and (2) at least 0.01 part by weight per 100 parts of (1) of a silane of the formula $(R''O)_3SiR'''Y_n$ in which each $R''$ is an alkyl radical of less than four carbon atoms, each $R'''$ is an aliphatic hydrocarbon radical containing from three to five carbon atoms and having a valence of $n+1$ where $n$ is an integer from 1 to 3 and Y is a monovalent radical attached to $R'''$ by a carbon-nitrogen bond and composed of hydrogen atoms, nitrogen atoms and up to eight carbon atoms and containing at least one amine group, the ratio of carbon atoms to nitrogen atoms in Y being less than about 6:1 and thereafter allowing the mixture to cure.

9. A method comprising mixing together (1) an organosilicon composition containing an average of at least two silicon-bonded hydroxyl groups per molecule and from 1.0 to 1.9 silicon-bonded methyl and phenyl radicals per silicon atom of which from 0.25 to 1.0 radical is the phenyl radical and (2) at least 0.01 part by weight per 100 parts of (1) of a silane of the formula $(R''O)_3SiR'''Z_n$ in which each $R''$ is an alkyl radical of less than four carbon atoms, each $R'''$ is an aliphatic hydrocarbon radical containing from three to five carbon atoms and having a valence of $n+1$ where $n$ is an integer from 1 to 3 and each Z is a monovalent radical attached to $R'''$ by a carbon-nitrogen bond and composed of hydrogen atoms, nitrogen atoms and from one to eight carbon atoms and containing at least two amine groups, the ratio of carbon atoms to nitrogen atoms in the silicon substituent —R'''$Z_n$ being less than 6:1 and thereafter allowing the mixture to cure.

References Cited
UNITED STATES PATENTS

| | | | |
|---|---|---|---|
| 2,833,742 | 5/1958 | Koch | 260—46.5 |
| 2,843,555 | 7/1958 | Berridge | 260—46.5 |
| 2,902,467 | 9/1959 | Chipman | 260—46.5 |
| 2,942,019 | 6/1960 | Pike et al. | 260—46.5 |
| 2,715,133 | 8/1955 | Speier | 260—448.2 |
| 3,133,110 | 5/1964 | Morehouse et al. | 260—46.5 |
| 3,160,601 | 12/1964 | Hyde | 260—46.5 |
| 3,170,894 | 2/1965 | Brown et al. | 260—448.2 |

DONALD E. CZAJA, *Primary Examiner.*

L. J. BERCOVITZ, *Examiner.*

M. I. MARQUIS, *Assistant Examiner.*